United States Patent
Sun et al.

(10) Patent No.: US 9,219,629 B1
(45) Date of Patent: Dec. 22, 2015

(54) ADAPTIVE LOW COMPLEXITY CHANNEL ESTIMATION FOR MOBILE OFDM SYSTEMS

(71) Applicants: Ning Sun, Vernon Hills, IL (US); Wayne E. Bretl, Grayslake, IL (US); Nejib Ammar, Vernon Hills, IL (US)

(72) Inventors: Ning Sun, Vernon Hills, IL (US); Wayne E. Bretl, Grayslake, IL (US); Nejib Ammar, Vernon Hills, IL (US)

(73) Assignee: Zenith Electronics L.L.C., Lincolnshire, IL (US)

( * ) Notice: Subject to any disclaimer, the term of this patent is extended or adjusted under 35 U.S.C. 154(b) by 0 days.

(21) Appl. No.: 14/470,413

(22) Filed: Aug. 27, 2014

(51) Int. Cl.
*H04L 27/06* (2006.01)
*H04L 27/26* (2006.01)

(52) U.S. Cl.
CPC .................................. *H04L 27/2649* (2013.01)

(58) Field of Classification Search
CPC ............................. H04L 25/067; H04L 1/0045
USPC .......................................................... 375/340
See application file for complete search history.

(56) References Cited

U.S. PATENT DOCUMENTS

| 7,801,230 | B2 | 9/2010 | Sung et al. | |
|---|---|---|---|---|
| 8,095,076 | B2 | 1/2012 | Aedudodla et al. | |
| 2006/0128326 | A1* | 6/2006 | Pietraski | 455/130 |
| 2010/0272194 | A1* | 10/2010 | Zhengang et al. | 375/260 |
| 2014/0328439 | A1* | 11/2014 | Walker | 375/348 |

OTHER PUBLICATIONS

O. Edfors et al., OFDM Channel Estimation by Singular Value Decomposition, IEEE Transactions on Communications, vol. 46 No. 7, pp. 931-939, Jul. 1998.
M. Necker et al., An Adaptive Wiener-Filter for Improved Channel Estimation in mobile OFDM-Systems, International Symposium on Signal Processing and Information Technology, IEEE Dec. 28-30, 2001, pp. 213-216.
ETSI Technical Specification 102 831—Digital Video Broadcasting (DVB); Implementation guidelines for a second generation digital terrestrial television broadcasting system (DVB-T2), V1.2.1 (Aug. 2012).
Cui et al., Power Delay Profile and Noise Variance Estimation for OFDM, IEEE Communications Letters, vol. 10, No. 1, Jan. 2006.
Li et al., Robust Channel Estimation for OFDM Systems with Rapid Dispersive Fading Channels, IEEE Transactions on Communications, vol. 46, No. 7, Jul. 1998.

* cited by examiner

*Primary Examiner* — Tanmay Shah

(57) ABSTRACT

Adaptive low complexity minimum mean square error (MMSE) channel estimator for OFDM systems operating over mobile channel. Complexity of the estimator is reduced by partitioning sub-carriers into windows where, window size is optimized by considering channel model mismatch error (MME). Three types of adaptive windowed MMSE (W-MMSE) estimators include: A first type, a simplified delay profile applied as channel reference model, and optimum window size adaptive to the estimated signal-to-noise ratio. A second type, a group of candidate channel reference models are considered. The receiver roughly estimates and selects current reference model from candidate group, then adapts optimum window size based on the estimated SNR and selected channel model. A third type, the current channel statistics are finely estimated and window size is iteratively optimized at receiver. The first two adaptive W-MMSE estimators are tolerant to channel model mismatch error and the third captures channel variations to realize real-time estimation.

21 Claims, 14 Drawing Sheets

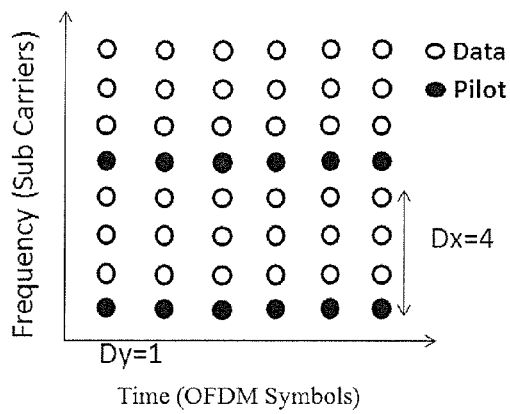
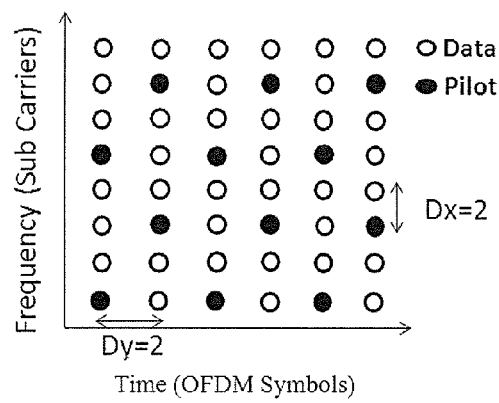
Fig. 3A          Fig. 3B
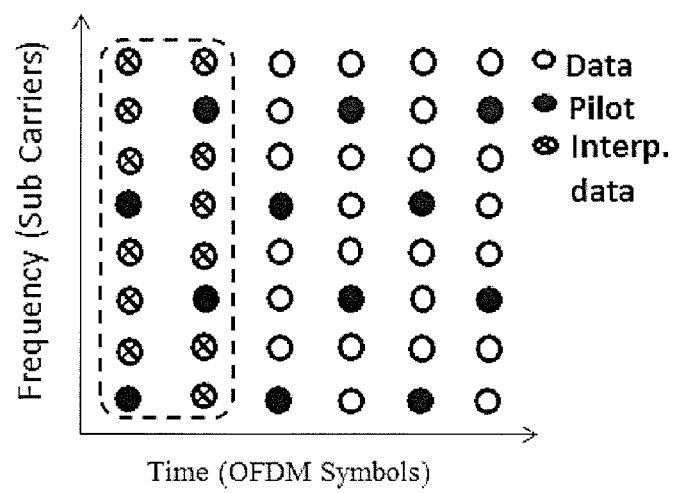
Fig. 4

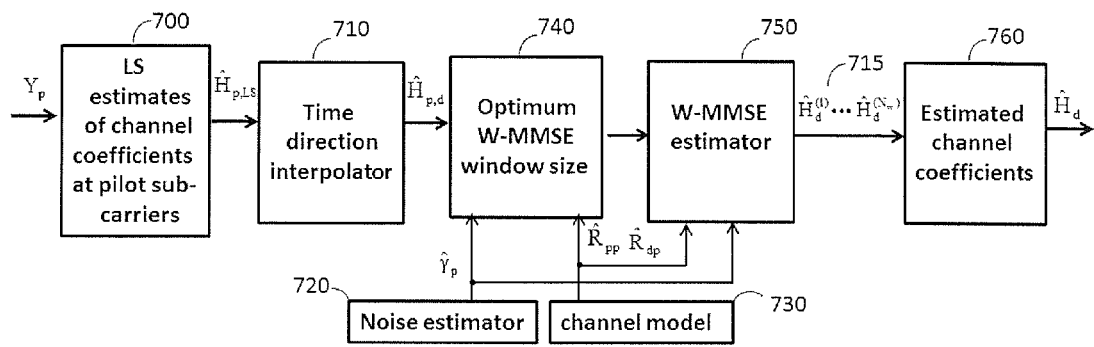
Fig. 7
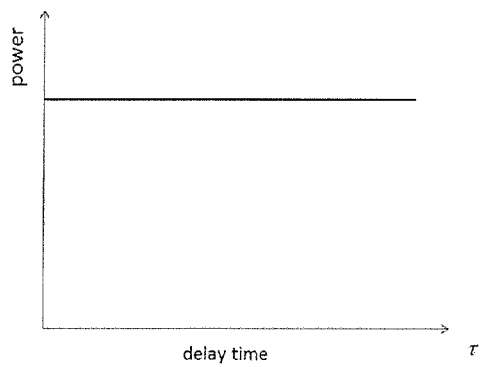
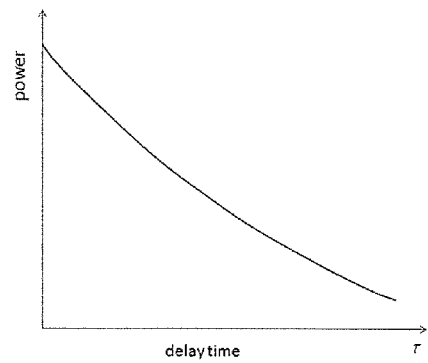
Fig. 8A          Fig. 8B

| Reference channel model | SNR (dB) | | | | | |
| --- | --- | --- | --- | --- | --- | --- |
| | 0 ~ 5 | 6 ~ 10 | 11 ~ 15 | 16 ~ 20 | 21 ~ 25 | 26 ~ 30 |
| Ch. A | 32 | 32 | 32 | 32 | 16 | 16 |
| Ch. B | 16 | 16 | 16 | 8 | 8 | 8 |

Fig. 12

ADAPTIVE LOW COMPLEXITY CHANNEL ESTIMATION FOR MOBILE OFDM SYSTEMS

TECHNICAL FIELD OF THE INVENTION

The proposed estimator can apply to receivers for any communications system using OFDM (orthogonal frequency-division multiplexing) or COFDM (coded orthogonal frequency-division multiplexing), including digital TV broadcast receivers, cell phones, or data systems such as Wi-Fi.

BACKGROUND

Mobile reception in OFDM (orthogonal frequency-division multiplexing) systems has received increasing attention with the growing demands for applications such as for communication in high speed railways. In mobile OFDM systems, the accurate estimation and tracking of time-varying and frequency selective fading is critical to the design of the frequency domain equalization and detection. Pilots can be inserted in transmitted OFDM symbols to assist channel estimation in various standards, e.g., scattered and edge pilots are inserted in time and frequency directions to assist channel estimation in the second generation digital terrestrial television broadcasting system (DVB-T2) and advanced television systems committee (ATSC) 3.0 systems. Channel estimations are used to operate the frequency domain equalizer to improve signal reception.

Generally, the receiver first obtains estimates of the channel frequency response using pilot sub-carriers, then interpolates this response to provide a channel estimate for the data sub-carriers. The channel estimate is applied to the equalizer in the receiver and is subsequently updated to track changing channel conditions. In the frequency domain the data sub-carriers can be estimated using a time-frequency two-dimensional (2D) filter to get a good estimation of the data, but this technique results in high computation complexity. Thus two one-dimensional (1D) filters, the first one for time direction interpolation and the second for frequency direction interpolation, may be used alternatively although with a slight performance loss. The channel estimator disclosed herein can be applied to the time-frequency 2D estimation, 1D time direction estimation and 1D frequency direction estimation, respectively.

Frequency domain interpolation may be performed using many different interpolation techniques such as linear, cubic and spline interpolations or a combination thereof. Linear interpolation is popular in practical implementations due to its low complexity, but provides relatively poor performance. Due to the nature of broadcast RF (radio frequency) signals, there are some similarities between different channel coefficients even when the channel experiences fast changes. These similarities may be quantified by a function referred to as channel correlation. Exploiting the channel correlation and noise variance characterizing a given channel, a MMSE (minimum-mean-square error) estimator can significantly improve the estimation accuracy of the data sub-carriers. However, two constraints impede the implementation of the MMSE estimator in a practical system. The first is that the channel statistics and noise variance is usually unknown, especially in a mobile scenario. The second is the high computing complexity caused by the matrix inversion operation in the MMSE. Many prior art works focus on the design of a practical MMSE estimator to overcome one or both of the above two constraints.

Corresponding to the first constraint, channel estimators have been proposed by either constructing a reference channel model or by real-time estimation of the current channel statistics. An ideal band-limited time domain correlation and a rectangular delay profile have been suggested for estimators incorporating the reference channel model. Similarly, a uniform power delay profile has been used in the cases where the worst correlation is expected. The foregoing reference channel models are insensitive to variations in channel statistics and are relatively simple to implement. Another method is to roughly estimate the actual current channel correlation and then design the MMSE estimator to be adaptive to the current channel. An extra computing effort is required to obtain the accurate channel model, thus implementation complexity is increased.

In case of the reference model based MMSE channel estimator, due to fast fading variations, channel model mismatch errors (MME), i.e., the errors caused by the difference between the reference channel model and the real channel, are usually inevitable in practical mobile communication systems. Designing a MMSE estimator that is naturally tolerant of this mismatch provides significant improvement over the prior art estimators.

Turning to the second constraint, various techniques have been proposed to reduce the complexity of the MMSE estimator, such as singular value decomposition (SVD), which works for the block-type pilots with the assumption of perfect channel correlation. U.S. Pat. No. 7,801,230, in order to reduce complexity, discloses the use of a split MMSE (S-MMSE) that separates the sub-carriers into groups, and a separate filter is applied into each sub-group independently. However, some significant limitations hinder implementation of this application. First, the proposed method only works for block type pilots. It does not work for comb-type pilots such as those in DVB-T2 or ATSC 3.0. Second, it is assumed the channel statistics are perfectly known, while the perfect prior information is not available in mobile OFDM systems. Finally, the window size obtained under the ideal channel correlation assumption does not work well for systems with channel model mismatch.

BRIEF DESCRIPTION OF THE DRAWINGS

FIG. 3A is a first exemplary comb-type pilot pattern useful in certain embodiments of the invention in which $D_x=4$ and $D_y=1$.

FIG. 3B is a second exemplary comb-type pilot pattern useful in certain embodiments of the invention where $D_x=2$ and $D_y=2$.

FIG. 4 illustrates a 2D interpolation of the data and pilots of FIG. 3B.

FIG. 7 is a functional block diagram of an exemplary 1D frequency direction estimation with the W-MMSE estimator of a certain embodiment of the invention.

FIG. 8A is a graph that illustrates a first exemplary channel delay function used as a reference channel model according to certain embodiments of the invention.

FIG. 8B is a graph that illustrates a second exemplary channel delay function used as a reference channel model according to certain embodiments of the invention.

FIG. 12 is an exemplary table of the optimum window size obtained from the pre-calculation in FIG. 11.

DETAILED DESCRIPTION

Figure 1:
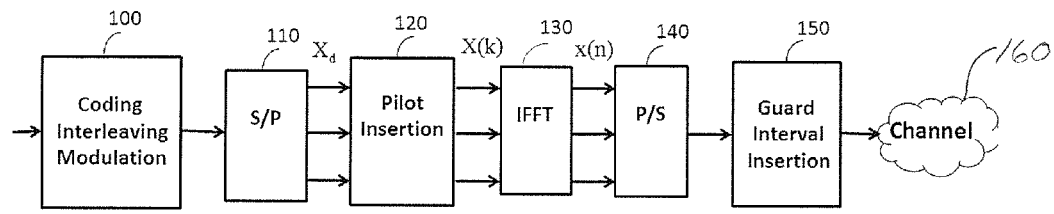
FIG. 1 is a functional block diagram of an OFDM transmitter.

FIG. 1 is a block diagram of a baseband OFDM (orthogonal frequency-division multiplexing) transmitter. Data bits are encoded, interleaved and mapped into constellations (e.g., QPSK (quadrature phase shift keying) or M-QAM (multiple quadrature amplitude modulation)) by a processor 100 (labeled as coding, interleaving, mapping in the Figure), then provided to a Serial-to-Parallel (S/P) converter 110. Pilots, such as pilots having a comb-type scattered pattern are then inserted in the time-frequency hyper plane by a pilot inserter 120 to assist channel estimation. For example, comb-type pilot patterns used in standards like DVB-T2 (digital video broadcasting—second generation terrestrial) and ATSC (Advanced Television Systems Committee) 3.0 may be employed. In FIG. 1, comb-type scattered pilots are used as an example to illustrate the channel estimation algorithms described herein. Note that the channel estimation algorithms proposed herein are applicable not only to the comb-type pilots in DVB-T2 and ATSC 3.0, but also to the block-type training sequence such as used in IEEE (Institute of Electrical and Electronics Engineers) 802.11.

FIGS. 3A and 3B illustrate exemplary comb-type pilot patterns. The separation of pilot bearing carriers is denoted as $D_x$ and the number of symbols forming one scattered super-pilot sequence is $D_y$. Thus the pilot is scattered by $D_x$ sub-carriers over $D_y$ OFDM symbols. For further reference, the total number of sub-carriers in one symbol may be denoted as N, the number of pilots as $N_p$ and the number of data as $N_d$, respectively. Referring back to FIG. 1, after pilot insertion, an inverse fast Fourier transform (IFFT) 130 is performed to transform frequency domain X(k) into time domain x(n). Both of the data $X_d$ and pilot $X_p$ are included in X. The output of the IFFT is supplied to a Parallel-to-Serial (P/S) converter 140 to provide a serial time domain OFDM signal for transmission. Before transmission, the OFDM signal is supplied to a guard interval inserter 150 which inserts a cyclic prefix (CP) in the signal large enough to prevent inter-symbol-interference (ISI). The OFDM signal may experience time-varying frequency-selective fading with additive white Gaussian noise (AWGN) as it is transmitted through a transmission channel 160.

Figure 2:
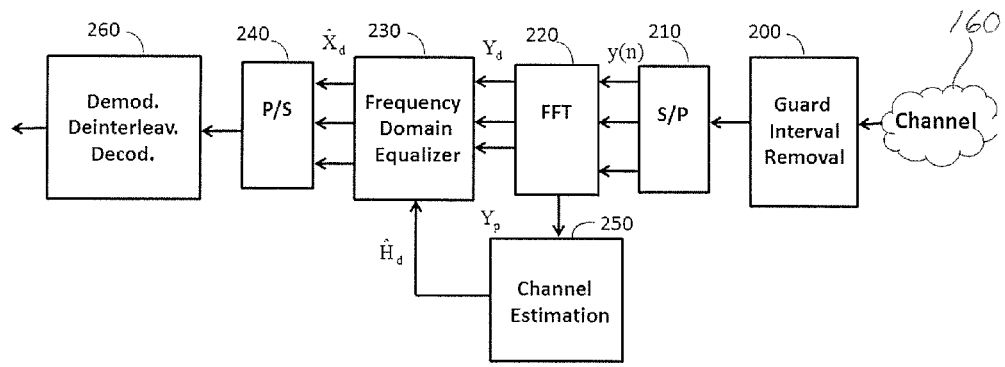
FIG. 2 is a functional block diagram of an OFDM receiver.

FIG. 2 is a block diagram of a baseband OFDM receiver. At the receiver, the CP (cyclic prefix) is first removed by a guard interval remover 200 from the received signal stream from the transmission channel 160. The received signal stream is then supplied to a S/P converter 210. A fast Fourier transform (FFT) 220 follows to transform the time domain signal y(n), comprising a version of x(n) as distorted by the channel, into the frequency domain Y. The frequency domain signal Y comprises the received data $Y_d$ and received pilot $Y_p$. The received data $Y_d$ is applied from FFT 220 to a frequency domain equalizer 230 (to reduce errors in $Y_d$) and therefrom to a processor 240 (labeled in the Figure as Demod., Deinterleav., Decod.) for the demodulating, deinterleaving, and decoding the equalized signal. The received pilot $Y_p$ is extracted from Y by a channel estimator 250. Channel estimator 250 outputs the channel coefficients $\hat{H}_d$ of data sub-carriers. The estimated channel coefficients $\hat{H}_d$ are taken as the initial setting of the frequency domain equalizer 230 for channel equalization. The channel estimator 250 preferably implements a W-MMSE (windowed minimum mean square error) channel estimation according to the invention to derive coefficients $\hat{H}_d$.

Figure 5A:
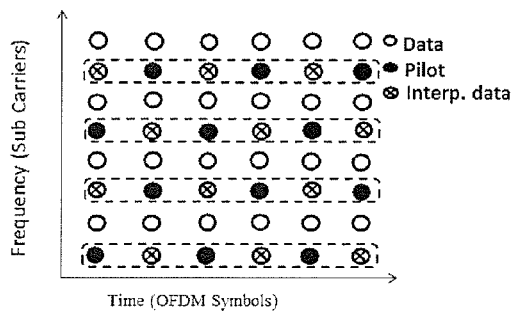
FIG. 5A illustrates a 1D time interpolation of the pilots of FIG. 3B.
Figure 5B:
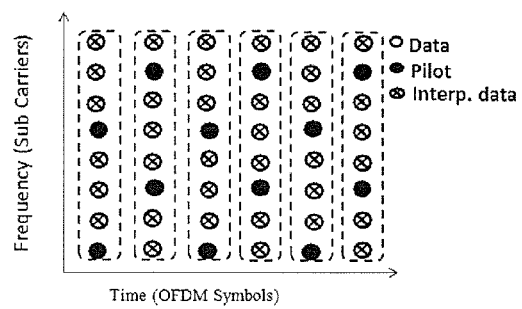
FIG. 5B illustrates a 1D frequency interpolation of the data and pilots of FIG. 5A.

The channel estimator 250 first obtains an estimate of the channel frequency response at the pilot sub-carriers. The estimation of pilots may be performed based on the Least Square (LS) method for simplification. It also can be estimated using the W-MMSE method disclosed herein. After getting the estimated channel coefficients $\hat{H}_d$ of the pilot sub-carriers, the channel estimates of data sub-carriers are obtained through interpolating the estimated coefficients of pilot sub-carriers. A time-frequency 2D estimation can be performed as shown in FIG. 4. The 2D estimator results in a high computation complexity. In a more practical system, two 1D filters may be used for implementation, as shown in FIGS. 5A and 5B. The time direction interpolation is first performed as shown in FIG. 5A, and then interpolation in the frequency direction follows as shown in FIG. 5B. The channel estimator 250 can be implemented using the time-frequency 2D estimation method shown in FIG. 4, the 1D time direction estimation in FIG. 5A and 1D frequency direction estimation in FIG. 5B. In the following description, the 1D frequency direction interpolation is used as an example to explain the invention.

Since only frequency direction interpolation is considered in this example, the symbol index is omitted for brevity. With the help of CP, the orthogonality between sub-carriers can be fully preserved, thus the observations of N sub-carriers in one symbol can be written as $$Y = XH + Z, \quad (1)$$

where $X \in S^{N \times N}$ is a diagonal matrix with the transmitted pilot and data signal on its diagonal, $H \in C^{N \times 1}$ is the channel frequency response vector, and, $Z \in C^{N \times 1}$ is the AWGN sample with variance $\sigma_e^2$. S is the modulation alphabet set and C is the set of complex number.

With the comb-type scattered pilot pattern in the FIG. 3A, the pilots are extracted from the N sub-carriers by the channel estimator 250 and represented in matrix form as:

$$X_p H_p + Z_p, \quad (2)$$

where $Y_p \in C^{N_p \times 1}$, $X_p \in S^{N_p \times N_p}$, $H_p \in C^{N_p \times 1}$, $Z_p \in C^{N_p \times 1}$ are the samples of the extracted pilots of Y, X, H, Z in (1), respectively.

The extracted pilots are then used by the channel estimator 250 to estimate the data through interpolation. FIG. 7 is a block diagram illustrating a 1D frequency direction estimation including a novel W-MMSE (window minimum mean squared error) estimator that may be used to derive the channel coefficients.

In this exemplary embodiment, the LS estimation performed by block 700 is used to obtain the estimate of the channel coefficients at the pilot locations. The estimated results of these channel coefficients are represented as $$\hat{H}_{p,ls} = X_p^{-1} Y_p, \quad (3)$$

A time direction interpolator 710 follows to derive $\hat{H}_{p,d}$ by interpolating $\hat{H}_{p,ls}$ using an interpolation algorithm such as a simple linear interpolation. The following portion of FIG. 7 depicts the output 715 of the novel W-MMSE channel coefficient estimator. Conventionally, in the frequency direction, the MMSE estimate of channel coefficients at the data sub-carriers is expressed as, $$\hat{H}_d = R_{dp}\left(R_{pp} + \frac{1}{\gamma_p}\right)^{-1} \hat{H}_{p,d} \quad (4)$$

where $R_{pp}$ is the channel auto-correlation matrix of pilot sub-carriers, $R_{dp}$ is the cross-correlation matrix between pilot and data sub-carriers, and $$\gamma_p = \frac{E_p}{\sigma_e^2}$$

is the SNR with $E_p$ being the power of pilots.

The matrices $R_{pp}$ and $R_{dp}$ depend on the channel conditions. Due to the communication environment variations such as the relative movement between the transmitter and receiver in the mobile case, the channel statistics change with respect to time. Therefore, the ideal assumption of channel statistics and noise variance cannot be matched to the real values any more. In other words, the prior knowledge of the matrices $R_{pp}$, $R_{dp}$, and $\gamma_p$ in equation (4) are not available. Therefore, in FIG. 7, a typical SNR is estimated by a noise estimator 720. Note that the SNR estimation is usually required by the other parts of the receiver such as for synchronization, thus the need for an estimation of the SNR does not increase complexity. Meanwhile, a well predefined reference channel model is established by block 730. Two exemplary delay profiles that may be used as channel reference models are shown in FIG. 8A and FIG. 8B, respectively.

Figure 6:
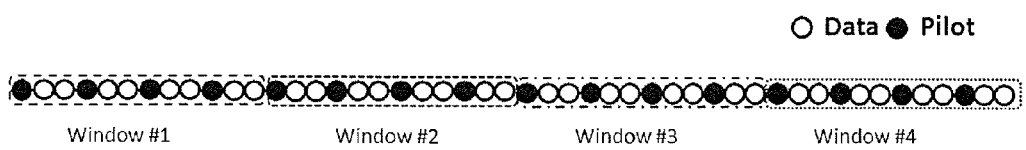
FIG. 6 illustrates the procedure of windowing according to certain embodiments of the invention.

The large dimension of the correlation matrix $R_{pp}$ causes high computing complexity. For example, if an FFT size of 8192 (8 k) is used and $D_x=16$, then the size of the matrix $R_{pp}$ is as high as 512×512. To reduce the complexity, in certain embodiments of this invention, the entire span of sub-carriers of an OFDM symbol is partitioned into equal-sized windows or non-overlapping groups of sub-carriers. The groups of sub-carriers may be analyzed along one dimension (time or frequency) or two dimensions (time and frequency). The receiver performs an estimation in each window independently while neglecting the correlation between the windows. The concept of windowing is shown in FIG. 6 where the span of sub-carriers is partitioned into multiple windows.

Figure 14:
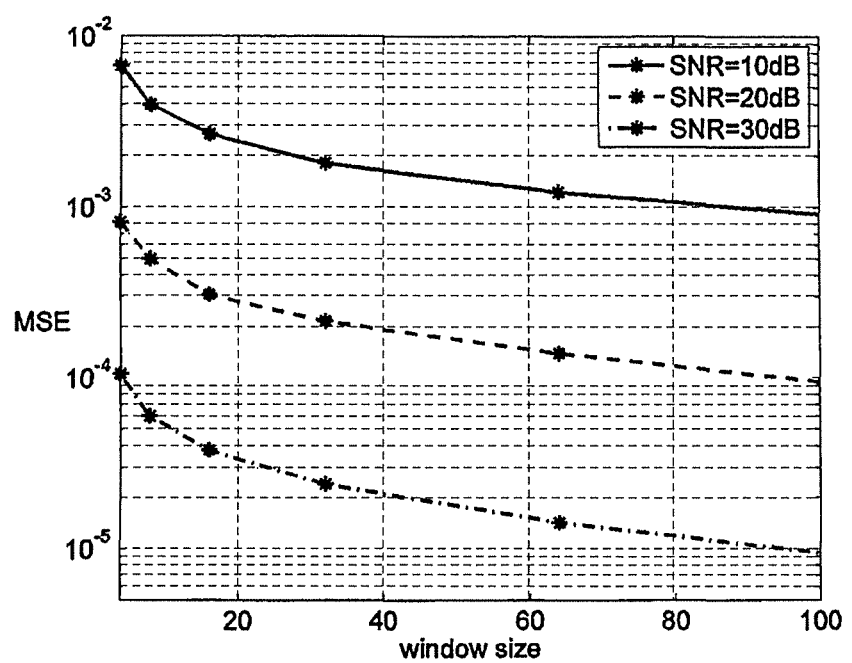
FIG. 14 is a graph that illustrates an exemplary performance of the W-MMSE estimator of certain embodiments of the invention as a function of the window size under ideal channel statistics.

The optimization of the window size or equivalently the number of windows is critical to the design of the W-MMSE estimator and determined by a processor 740 (labeled in the Figure as Optimum W-MMSE window size). With a hypothetical ideal SNR (i.e. a value perfectly known at the receiver) and an ideal channel model from blocks 720 and 730, a larger window size will provide better channel estimation results. This can be explained by the fact that the larger window size means more pilots are used for the estimation, thus leading to a better estimation. This may be confirmed by simulation as shown in the FIG. 14. In FIG. 14, the MSE (minimum square error) is shown as a function of the window size under different SNRs. The FFT size is 8 k, QPSK modulation is used, an elementary period is 0.146 µs, and $D_x=16$. The channel model in the simulation is TU6 (six tap typical urban). The ideal SNR and channel model are explored in the simulation. It is observed that the channel estimation MSE decreases as the window size increases under various SNR. Thus a larger window size can benefit the channel estimation.

Figure 15:
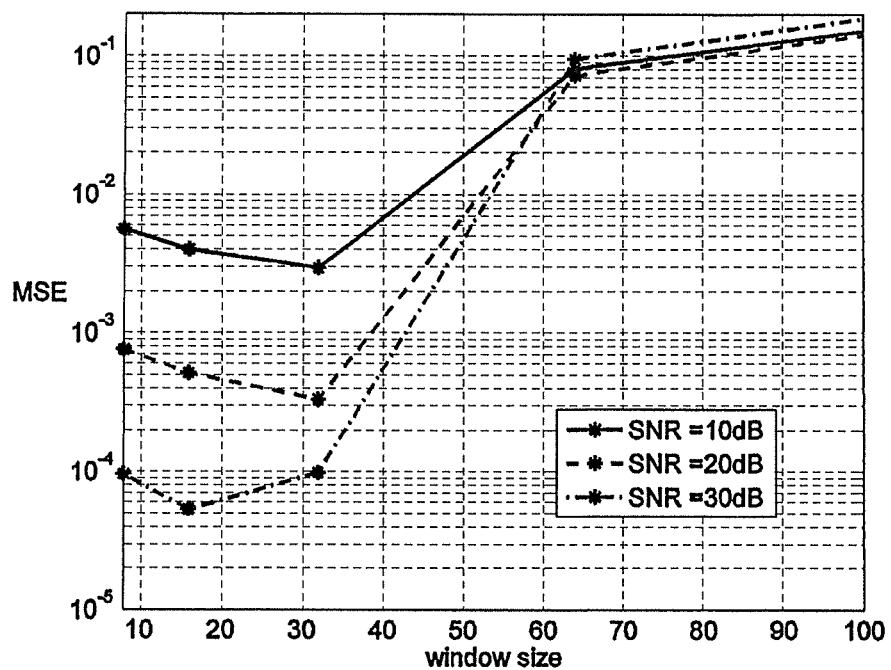
FIG. 15 is a graph that illustrates an exemplary performance of the W-MMSE estimator of certain embodiments of the invention as a function of the window size under a channel model mismatch.

In contrast, the trend differs when the practical estimated SNR and reference channel model are applied. With the channel model mismatch, on one hand, the larger window size can positively contribute to the estimation due to the availability of more pilots. On the other hand, more pilots result in a larger channel model mismatch error, and this negatively affects the estimation result. This tradeoff relationship is further revealed in FIG. 15. The MSE is shown in FIG. 15 as a function of the window size under different SNR. The curves in FIG. 15 differ from the simulation in FIG. 14 because a uniform power delay profile is adopted as the predefined reference channel model. It is observed that the MSE is implicitly convex in the window size. Thus, the statement that the larger window sizes provide the better performance does not hold for such a system. Instead, the window size which leads to the minimum MSE needs to be determined.

In FIG. 15, it is also shown that the optimum window size varies with the SNR. Thus, the optimum window sizes are 32, 32 and 16 for SNR at 10 dB, 20 dB, 30 dB, respectively. Based on the above observation, in operation block 740 is designed so that the optimum window size adapts to the estimated SNR and reference channel model.

Referring back to FIG. 7, after the optimized window size is determined in block 740, the W-MMSE is applied within each window by a plurality of estimators as shown at block 750 as:

$$\hat{H}_d^{(i)} = \hat{R}_{dp}^{(i)}\left(\hat{R}_{pp}^{(i)} + \frac{1}{\hat{\gamma}_p}\right)^{-1} \hat{H}_{p,d}^{(i)}, \quad (5)$$

where i=1, ... $N_w$ and $N_w$ is the optimized window number from operation 740.

In a collecting step, the estimations of the channel coefficients are collected in block 760 from all the windows in sequence, which provides the channel coefficients for use.

Figure 9:
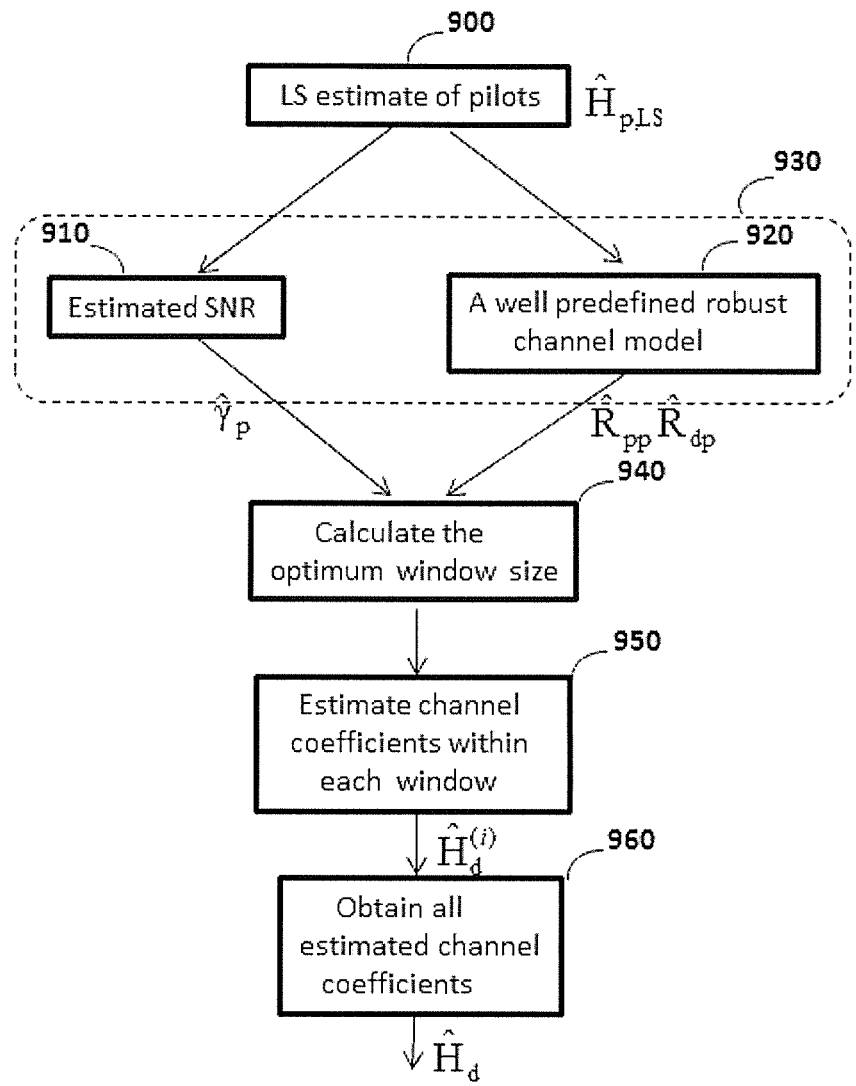
FIG. 9 is a flowchart of a first type W-MMSE estimator according to certain embodiments of the invention which is adaptive to the SNR and a predefined channel model.

FIG. 9 is a flowchart illustrating the operation of the W-MMSE estimator of FIG. 7 which is adaptive to the SNR and a predefined channel model according to certain embodiments of the invention. The LS is applied to estimate the channel coefficients of the received pilots at 900. The practical prior information at step 930, including the SNR estimated at step 910 and the robust reference channel model at step 920, is used to determine the optimum window size at step 940. This can be implemented using appropriate look-up tables which will be explained hereinafter with reference to FIG. 11 and FIG. 12. Finally, the channel coefficients are independently calculated for each window at step 950 according to expression (5) and the results are collected to get the entire estimates of the channel coefficients at 960.

Figure 10:
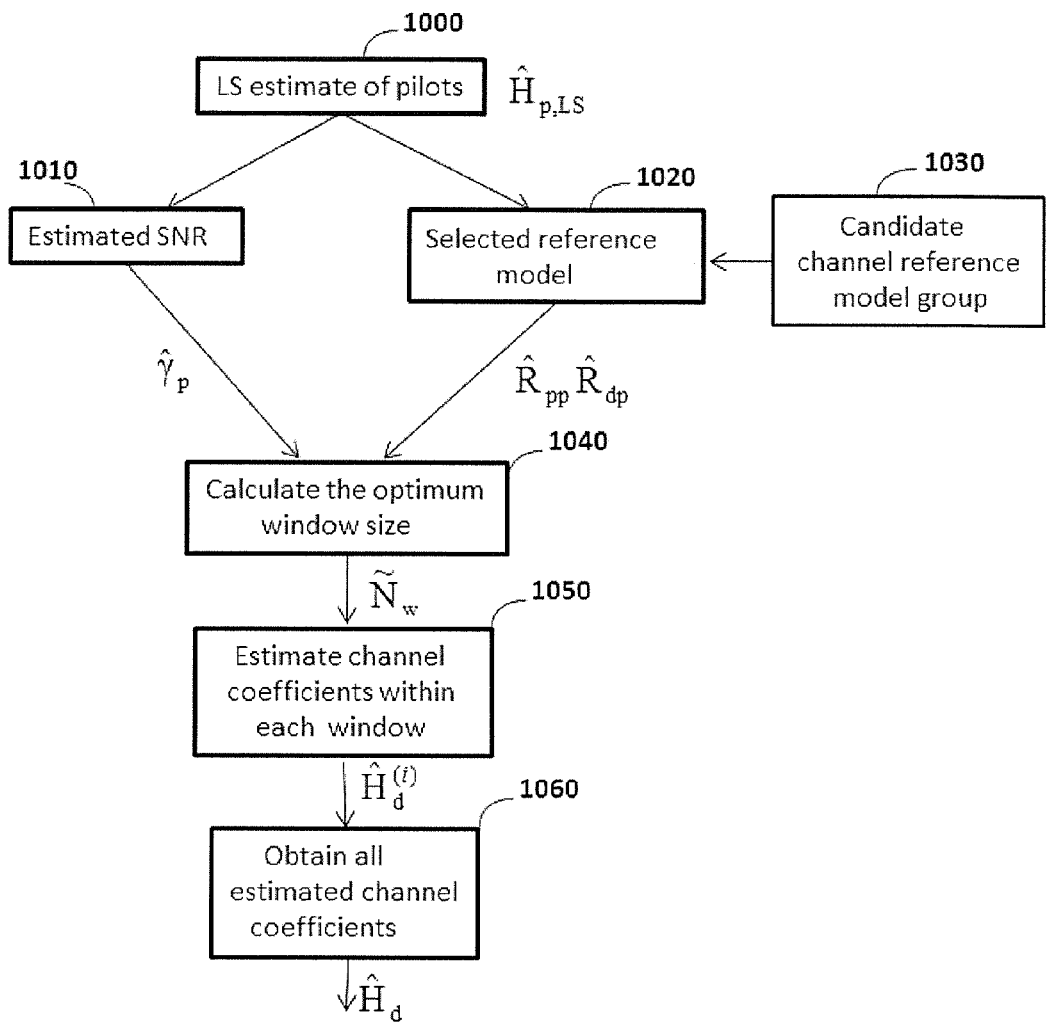
FIG. 10 is a flowchart of a second type W-MMSE estimator according to certain embodiments of the invention which is adaptive to both an estimated SNR and an estimated reference channel model.

To further improve the estimation performance, a second type of W-MMSE estimator, which is adaptive to both the SNR and the selected channel model is shown in the flowchart of FIG. 10. Steps 1000 and 1010 conform to steps 900 and 910 of FIG. 9. In step 1030, there is provided a group of candidate channel reference models. In step 1020, the best matched channel reference model is selected. The channel model selection can be realized by analyzing the received scatter pilot or CP. For example, the channel impulse response (CIR) may be obtained by taking the IFFT of the frequency domain channel estimate which is calculated at pilot locations. The power delay profile is generated from the estimated CIR or from the average of estimated CIR over several OFDM symbols. Then the reference channel is selected by comparing the parameters such as root-mean-squared (rms) delay spread of the estimated and candidate power delay profiles. Both of the estimated SNR and selected reference channel model are used to determine the optimum window size at 1040. The channel coefficients are then estimated within each window at step 1050 and collected at step 1060. This type of adaptive W-MMSE estimator is better to cope with channel variations in complicated communication environments, while the extra computing is required to obtain the channel model in 1030.

Figure 11:
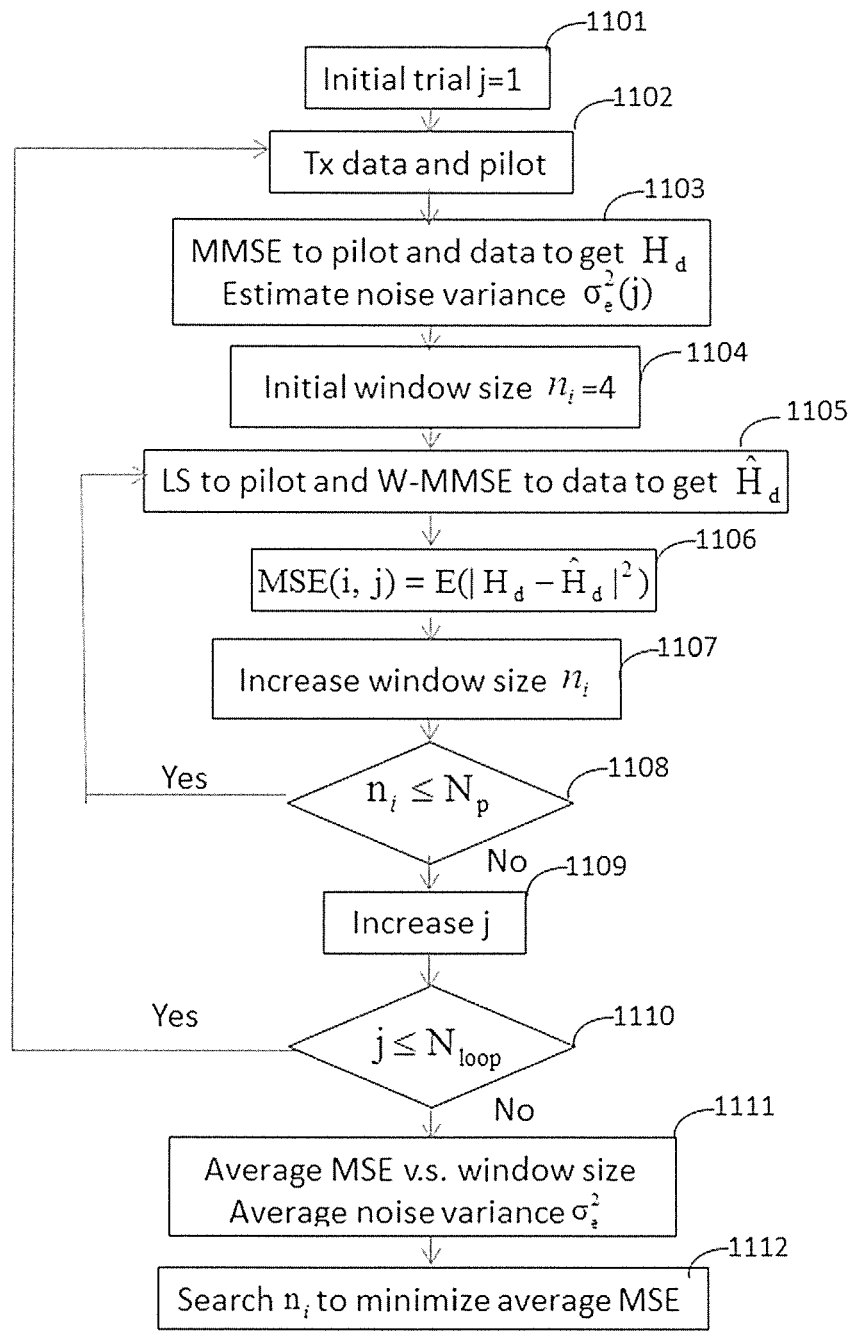
FIG. 11 is a flowchart of the pre-calculation of the optimum window size under a different SNR and a reference channel model.

The calculation of optimum window size in step 940 of FIG. 9 and in step 1040 of FIG. 10 can be realized by using a pre-calculated look-up table comprising part of the processor 740 of FIG. 7. The pre-calculation to populate the look-up table is shown in FIG. 11. Assume a transmitted reference channel A comprising an approximate simple TU6 type channel and a receiver having an exponential delay profile. Referring to FIG. 11, the pre-calculations to populate the look-up table comprise the steps of:

1) Start an initial trial at step 1101 which will ultimately result in the creation of a single curve of the type shown in FIG. 15.

2) First, at step 1102 simulate the transmission (Tx) of the approximate TU6 signal which includes both data and pilots at 1102.

3) At the receiver, in frequency domain, calculate the channel coefficients Hd at the data sub-carriers using an estimation algorithm such as MMSE at step 1103. The estimated coefficients at the data sub-carriers are approximately taken as the perfect channel information for the optimization of window size in W-MMSE. The noise variance is also estimated at step 1103.

4) Set the initial window size such as $n_i=4$ for the W-MMSE at step 1104.

5) At step 1105 perform LS to get the channel estimation at the pilot sub-carriers, and perform W-MMSE interpolation to obtain the channel estimate at data sub-carriers.

6) At step 1106, calculate the MSE between the real channel coefficients from step 1103 and the W-MMSE estimated coefficients from step 1105. The calculated MSE at window size=4 establish, for example, a first point x on a given curve of FIG. 15.

7) Next, the window size is increased by an increment (such as 4) at step 1107, i.e., $n_{i+1}=n_i+4$.

8) If the incremented window size is determined to be less than or equal to a predetermined limit $N_p$ at step 1108 the steps 1105-1108 are repeated to establish a second point (such as y) on the curve of FIG. 15. Steps 1105-1108 are successively repeated with the updated window sizes to derive additional points on the given curve of FIG. 15 until limit $N_p$ is achieved and the curve has been completed.

9) When the limit $N_p$ is achieved the trial index j is increased at step 1109 to start a new trial. Each new trial will result in the development of a new curve as shown in FIG. 15 until the total number of trials $N_{loop}$ is achieved 1110.

10) At this point, at step 1111 the average MSE and noise variance is calculated at each window size for each trial curve to produce a single averaged curve.

11) At step 1112 the optimal window size is established by finding the minimum average MSE 1112 characteristic of the curve produced according to the foregoing calculations.

The calculations set forth in FIG. 11 result in an optimum window size for a given range of SNR. The optimum window size for different SNRs can be obtained by repeating the calculations of FIG. 11 with the updated transmission power.

With the procedure illustrated in FIG. 11, an exemplary pre-calculated optimum window size look-up table is shown in FIG. 12 under different SNR and channel mode. At the receiver, such as in step 940 of FIG. 9, with the estimated SNR in step 910 and the reference channel model in step 920 (such as if 20 dB SNR and Ch. A channel are used), the receiver finds the optimum window size is 32 in the table of FIG. 12, and uses it as the optimum window size to facilitate the W-MMSE estimation.

The above two types of reference channel model based W-MMSE (those illustrated in FIGS. 9 and 10, respectively) may be implemented using look-up tables as herein described. W-MMSE can also be performed iteratively to track changes and/or variations of the channel in real-time with a higher computation complexity. This is shown in the flow chat in FIG. 13.

Figure 13:
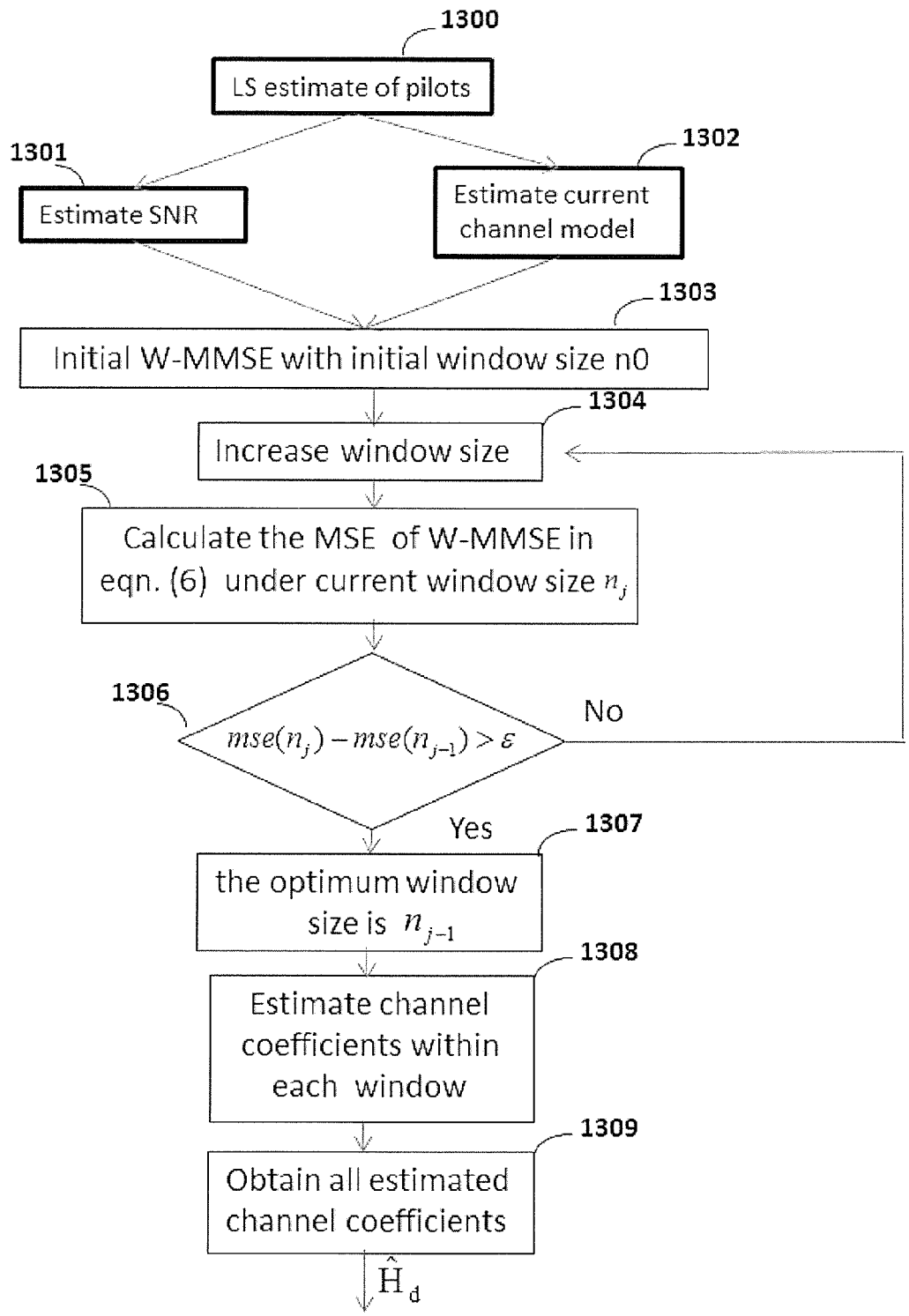
FIG. 13 is a flowchart of the third type iterative W-MMSE estimator according to certain embodiments of the invention which iteratively optimizes the window size in real-time.

FIG. 13 illustrates the use of W-MMSE with a real time (current) channel used in place of a reference channel as in FIGS. 9 and 10. As in FIG. 9 and FIG. 10, LS is performed to estimate channel coefficients at the pilot sub-carriers at step 1300 and SNR is estimated at step 1301. At 1302 the current channel statistics are estimated. Different from the channel selection in the second type W-MMSE shown in FIG. 10, this channel statistics estimation is more accurate with higher computation efforts. It can be realized by using more resources such as the preamble, side information, CP, or pilots of the OFDM signal at the receiver and taken as the prior information for the W-MMSE optimization. An initial MSE of W-MMSE is performed at step 1303 with the window size n=n0. The MSE of W-MMSE under window size $n_j$ at j-th iteration (see steps 1303 and 1305) is expressed as $$mse(n_j) = \sum_{i=1}^{N_w} \left( R_{pp}^{(i)} - R_{dp}^{(i)}\left( R_{pp}^{(i)} + \frac{1}{\gamma_p} \right)^{-1} R_{dp}^{H,(i)} \right) \tag{6}$$

where $R_{pp}$, $R_{dp}$ are obtained in step 1302 and the total number of windows $$N_w = \frac{N_p}{n_j}.$$

The window size is increased, by an increment such as 4, in step 1304 and the MSE of W-MMSE under the updated window size is calculated at step 1305. If the condition of 1306 is satisfied, where mse($n_j$) is the MSE under current window size is calculated at step 1305. If the stop condition of 1306 is not satisfied, where mse($n_j$) is the MSE under current window size $n_j$ at j-th iteration, mse($n_{j-1}$) is the MSE of the previous window size at (j−1)-th iteration, and c is a threshold decided in the implementation, the window size is increased at 1304 and a next iteration of steps 1305 and 1306 is performed. If the stop condition is satisfied, which means the current MSE is larger than the previous one, then the optimum window size is established at step 1307 as $n_{j-1}$. With the optimum window size obtained in 1307, channel coefficients are estimated within each window at step 1308 and collected at step 1309.

It should be noted that, for some applications, the optimum window size in steps 940, 1040, or 1307 may yield to a predefined hardware threshold if desired or necessary. When the optimum window size is smaller than the threshold, the optimum window size is used to calculate the channel coefficients. Otherwise, the predefined threshold is used as the optimum window size for calculating the channel coefficients.

Figure 16:
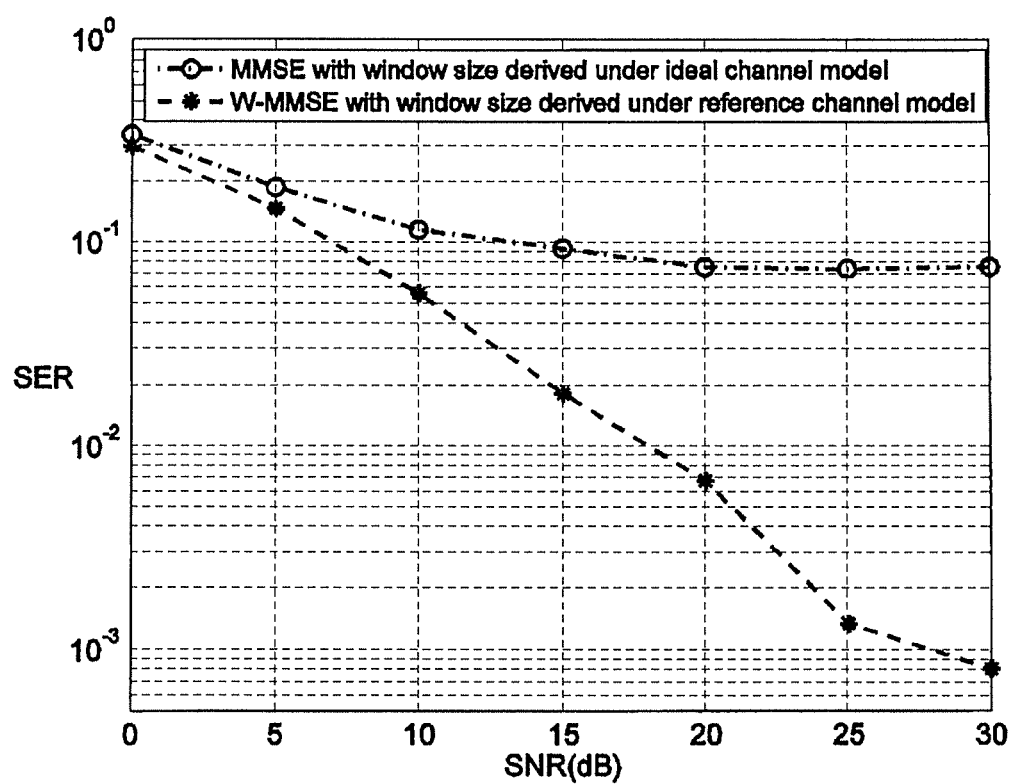
FIG. 16 is a graph that illustrates an exemplary symbol error rate comparison when the window sizes are obtained under an ideal channel model and under a reference channel model in the W-MMSE channel estimation.

FIG. 16 shows the simulated SER (symbol error rate) with the W-MMSE and MMSE channel estimations. The performances of W-MMSE with two window sizes are compared in the figure: one obtained under ideal channel model and another obtained under reference channel model. Both of these two are not iterative. The $D_x$=32, and TU6 are used in the simulation. Uniform delay profile is taken as the reference channel model. Other parameters are the same as those in FIG. 14. It is shown that the MMSE with the window size obtained under the ideal channel assumption does not perform well in certain cases of channel model mismatch.

Figure 17:
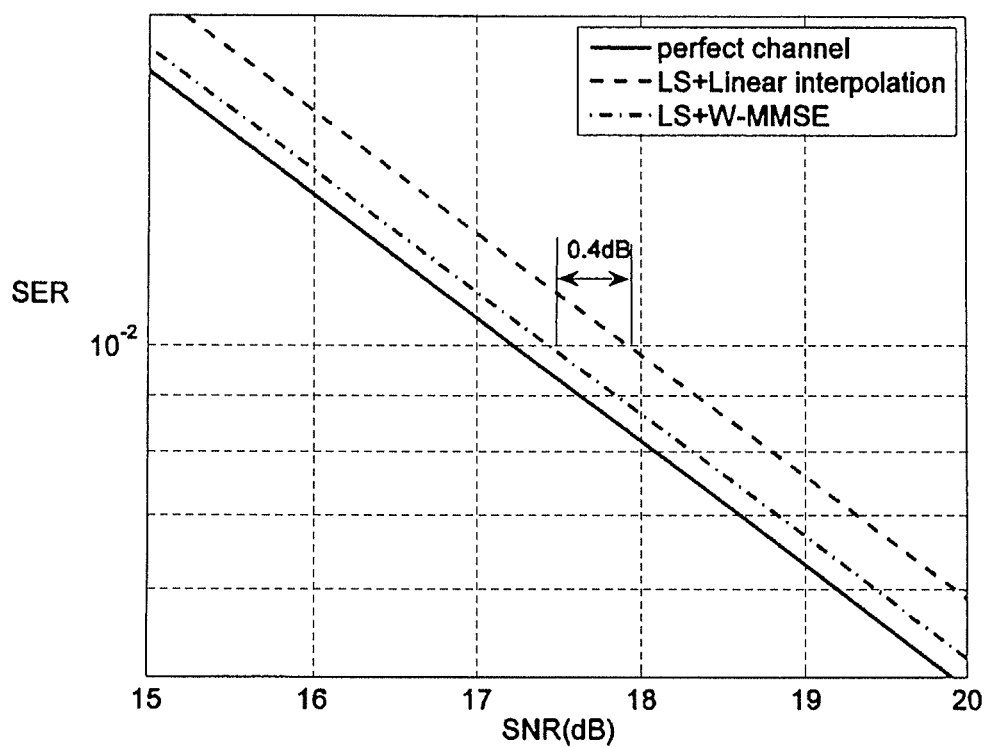
FIG. 17 is a graph that illustrates an exemplary performance comparison between the proposed W-MMSE estimator and a conventional linear interpolator under $D_x=16$.
Figure 18:
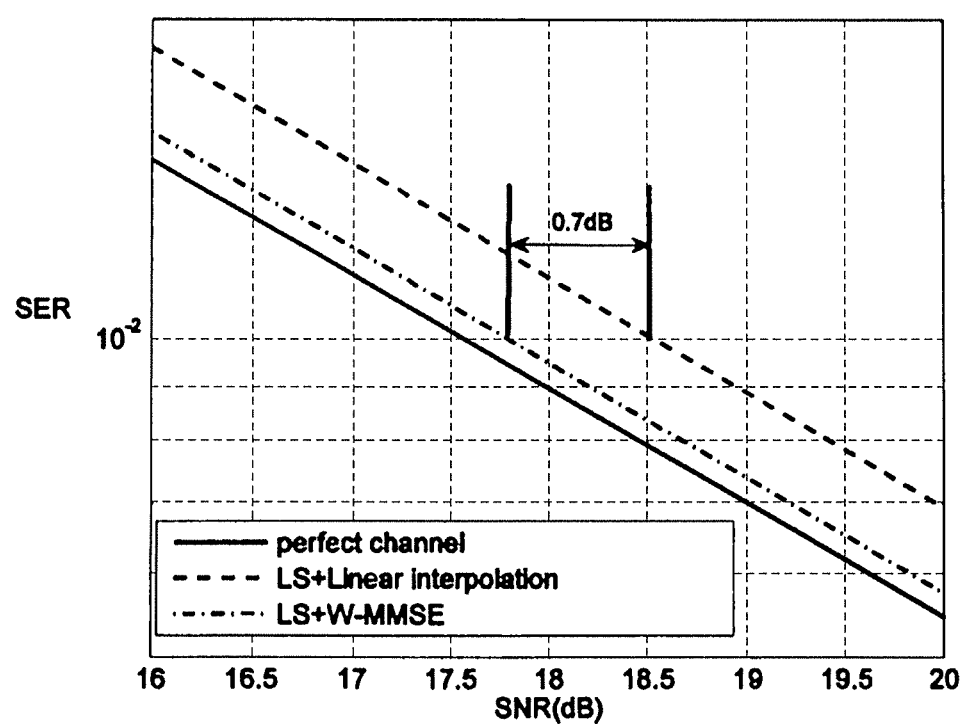
FIG. 18 is a graph that illustrates an exemplary performance comparison between the proposed W-MMSE estimator and a conventional linear interpolator under $D_x=8$.

FIG. 17 and FIG. 18 illustrate SER comparison with the optimized W-MMSE estimator and the conventional linear interpolator. $D_x$=16 for FIG. 17 and $D_x$=8 for FIG. 18. The other simulation parameters are the same as those in FIG. 14. Comparing the widely used linear interpolator, FIG. 17 shows a 0.4 dB performance gain with the adaptive W-MMSE estimator. For $D_x$=8, the performance gain can be as high as 0.7 dB in FIG. 18.

As previously indicated, the above description takes the frequency direction interpolation in FIG. 5B as an example. Some variations for the applications to estimation of pilots, 2D interpolation in FIG. 4, and 1D time direction interpolation in FIG. 5A are briefly explained here. To the application of estimating pilots, the cross-correlation $R_{dp}$ in equation (4) will become the auto-correlation $R_{pp}$. The reference channel model differs and the correlation between OFDM symbols is utilized. For 2D interpolation, the dimension and matrix structure of $R_{dp}$ and $R_{pp}$ in equation (4) will be different. The channel reference model becomes 2D, which considers both of the time correlation and the correlation among the multiple paths.

Although preferred embodiments of the method and apparatus of the present invention have been illustrated in the accompanying Drawings and described in the Detailed Description, it is understood that the invention is not limited to the embodiments disclosed, but is capable of numerous modifications and substitutions.

What is claimed is:

1. A method for channel estimation of OFDM (orthogonal frequency-division multiplexing) systems operating over time-varying frequency-selective fading channels, comprising the steps of:
    a) receiving an OFDM signal comprising pilot and data sub-carriers;
    b) providing a channel model;
    c) estimating the SNR (signal-to-noise ratio) of the received OFDM signal;
    d) determining an optimum window size that varies based on the estimated SNR and the channel model, the determined window defining each of a plurality of non-overlapping groups of the sub-carriers of the received OFDM signal;
    e) independently calculating the channel coefficients for each one of said groups; and
    f) collecting the channel coefficients calculated for all of the groups.

2. The method of claim 1, wherein the channel model comprises a predefined reference channel model.

3. The method of claim 1, wherein the channel model comprises a reference channel model selected from a group of candidate channel models best matched to the current channel.

4. The method of claim 1, wherein the determining step comprises selecting the optimum window size from a look-up table based on the SNR of the received signal and the channel model.

5. The method of claim 1, wherein the sub-carriers of each group are one-dimensional.

6. The method of claim 1, wherein the sub-carriers of each group are two-dimensional.

7. The method of claim 1, wherein the channel model comprises a reference channel model and wherein the delay profile of the reference channel model comprises a uniform power delay profile.

8. The method of claim 1, wherein the channel model comprises a reference channel model and wherein the delay profile of the reference channel model comprises an exponential delay profile.

9. The method of claim 1, wherein the SNR is estimated in response to pilot sub-carriers of the received OFDM signal.

10. The method of claim 1, wherein the optimum window size is determined by the minimum channel estimation (MSE) for a plurality of estimated SNR.

11. The method of claim 1, wherein the SNR is estimated in response to the cyclic prefix of the received OFDM signal.

12. The method of claim 1, further comprising the steps of:
    a) determining the optimum window size based on the minimum channel estimation (MSE) for a plurality of estimated SNR;
    b) comparing the optimum window size with a predefined threshold;
    c) if the optimum window size is smaller than the threshold, using the optimum window size to calculate the channel coefficients; and
    d) if the optimum window size is greater than the predefined threshold, using the predefined threshold as the optimum window size for calculating the channel coefficients.

13. A method for channel estimation of OFDM (orthogonal frequency-division multiplexing) systems operating over time-varying frequency selective fading channels, comprises the steps of:
    a) receiving an OFDM signal comprising pilot and data sub-carriers;
    b) estimating the SNR (signal-to-noise ratio) of the received OFDM signal;
    c) estimating a current channel model based on the received OFDM signal;
    d) determining an optimum window size defining each of a plurality of non-overlapping groups of the sub-carriers of the received OFDM signal based on the estimated SNR and the estimated current channel model;

e) independently calculating the channel coefficients for each one of said groups; and f) collecting the channel coefficients calculated for all of the groups.

14. The method of claim 13, wherein the current channel model estimation is made in response to the preamble of the received OFDM signal.

15. The method of claim 13, wherein the current channel model estimation is made in response to the pilot sub-carriers.

16. The method of claim 13, wherein the current channel model estimation is made in response to the cyclic prefix.

17. The method of claim 13, wherein the sub-carriers of each group are one dimensional.

18. The method of claim 13, is the sub-carriers of each group are two-dimensional.

19. The method of claim 13, wherein the optimum window size is calculated iteratively in real-time based on the estimated SNR and the estimated current channel model.

20. The method of claim 19, wherein the determining step comprises:

a) calculating the MSE of an initial W-MMSE based on an initial window size;

b) increasing the window size by a predetermined amount:

c) calculating the MSE of the W-MMSE based on the increased window size;

d) if the difference between two successive calculated MSEs does not exceed a predefined stop condition iteratively repeating steps b) to d) to calculate a series of increasing widow sizes, otherwise defining the optimum window size as the window size produced in the iteration previous to the iteration that resulted in the stop condition.

21. The method of claim 20, wherein the predefined stop condition comprises a predetermined threshold.

* * * * *